(12) United States Patent
Liu et al.

(10) Patent No.: US 12,289,172 B2
(45) Date of Patent: Apr. 29, 2025

(54) DYNAMIC CODE BLOCK GROUP (CBG) ALLOCATION

(71) Applicant: QUALCOMM Incorporated, San Diego, CA (US)

(72) Inventors: Chunhua Liu, Shanghai (CN); Shanshan Hei, Shanghai (CN); Jing Zhou, Beijing (CN); Xuanfan Shen, Kunming (CN); Hao Zhao, Shanghai (CN); Weikai Zhang, Shanghai (CN); Dimeng Wang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/550,903

(22) PCT Filed: Jun. 3, 2021

(86) PCT No.: PCT/CN2021/098068
§ 371 (c)(1),
(2) Date: Sep. 15, 2023

(87) PCT Pub. No.: WO2022/252169
PCT Pub. Date: Dec. 8, 2022

(65) Prior Publication Data
US 2024/0195541 A1    Jun. 13, 2024

(51) Int. Cl.
*H04L 1/1867* (2023.01)
*H04L 1/1825* (2023.01)
*H04L 1/1829* (2023.01)

(52) U.S. Cl.
CPC .......... *H04L 1/1893* (2013.01); *H04L 1/1825* (2013.01); *H04L 1/1864* (2013.01)

(58) Field of Classification Search
CPC .... H04L 1/1893; H04L 1/1825; H04L 1/1864
See application file for complete search history.

(56) References Cited

U.S. PATENT DOCUMENTS 10,958,384 B2 *   3/2021   Hwang ................. H04L 1/1664
11,303,392 B2 *   4/2022   Sun ....................... H04L 1/1614
(Continued)

FOREIGN PATENT DOCUMENTS

WO        2018204491 A1    11/2018

OTHER PUBLICATIONS

J. Wu, "Multilevel Code-block Group based HARQ-ACK Control Channel Design," 2018 International Conference on Computing, Networking and Communications (ICNC), Maui, HI, USA, 2018, pp. 264-268 (Year: 2018).*

(Continued)

*Primary Examiner* — Cynthia Britt
(74) *Attorney, Agent, or Firm* — Patterson & Sheridan, L.L.P.

(57) ABSTRACT

Certain aspects of the present disclosure relate to wireless communications, and more particularly, to techniques for xx. A method that may be performed by a user equipment (UE) includes receiving, from a network entity, a first transport block (TB) comprising one or more code blocks (CBs), transmitting, to the network entity, an indication of a preferred code block group (CBG) allocation scheme selected for re-transmission of at least one CB of the one or more CBs based, at least in part, on a decoding status for each of the one or more CBs, and receiving, from the network entity, the at least one CB re-transmitted in accordance with the preferred CBG allocation scheme.

26 Claims, 10 Drawing Sheets

(56) References Cited

U.S. PATENT DOCUMENTS

| | | | | |
|---|---|---|---|---|
| 11,374,703 B2* | 6/2022 | Cheng | ................... | H04L 1/1867 |
| 2019/0319767 A1 | 10/2019 | Sun et al. | | |
| 2020/0059327 A1* | 2/2020 | Kini | ...................... | H04L 5/0055 |
| 2020/0366411 A1* | 11/2020 | Xu | .................... | H03M 13/6306 |
| 2022/0052832 A1* | 2/2022 | Ersbo | ................... | H04L 5/1469 |
| 2022/0060304 A1* | 2/2022 | Sundararajan | ............ | H04L 1/08 |
| 2023/0269024 A1* | 8/2023 | Lee | ......................... | H04B 7/06 |
| | | | | 714/750 |

OTHER PUBLICATIONS

International Search Report and Written Opinion—PCT/CN2021/098068—ISA/EPO—Dec. 1, 2021.

* cited by examiner

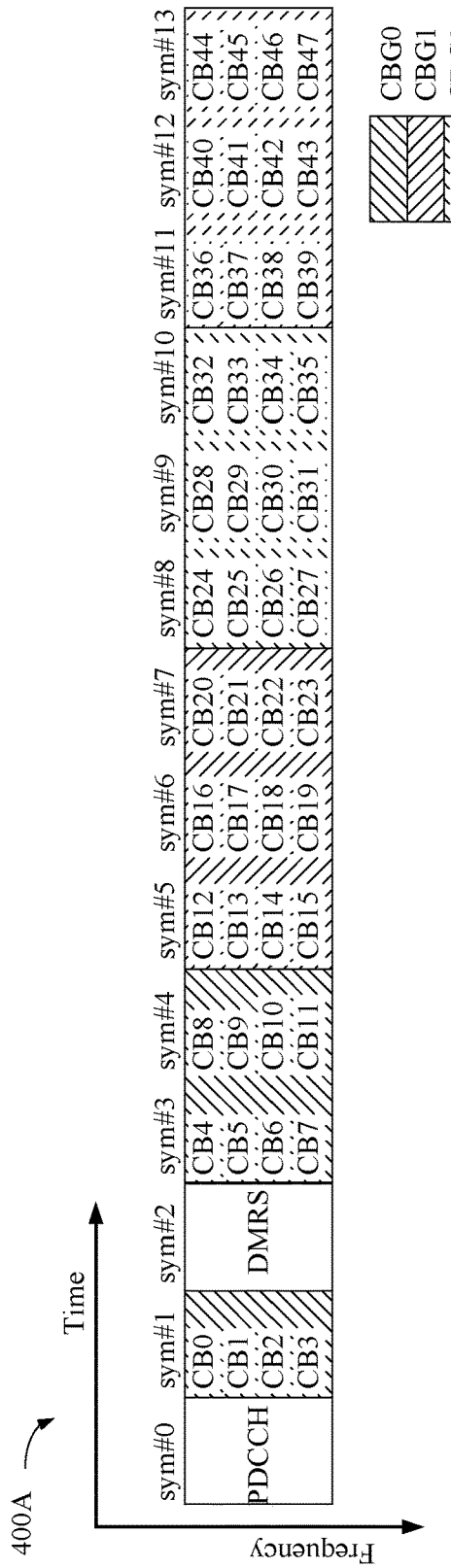
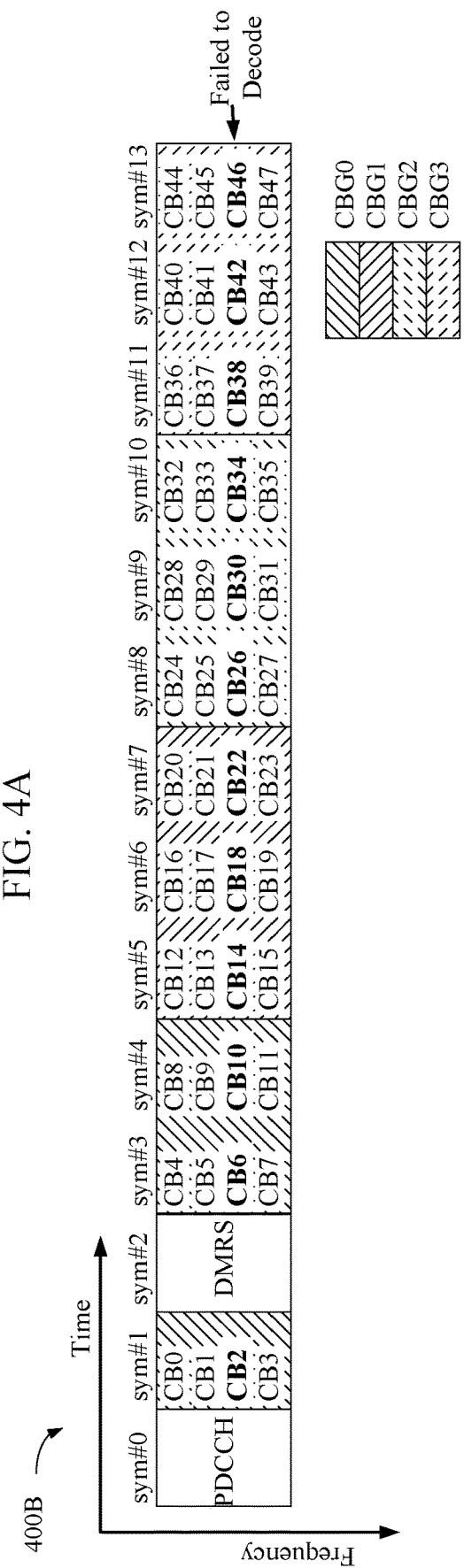
FIG. 4A
FIG. 4B

500

505

RECEIVING, BY A USER EQUIPMENT (UE), FROM A NETWORK ENTITY, A FIRST TRANSPORT BLOCK (TB) COMPRISING ONE OR MORE CODE BLOCKS (CBS)

510

TRANSMITTING, BY THE UE, TO THE NETWORK ENTITY, AN INDICATION OF A PREFERRED CODE BLOCK GROUP (CBG) ALLOCATION SCHEME SELECTED FOR RE-TRANSMISSION OF AT LEAST ONE CB OF THE ONE OR MORE CBS BASED, AT LEAST IN PART, ON A DECODING STATUS FOR EACH OF THE ONE OR MORE CBS

515

RECEIVING, BY THE UE, FROM THE NETWORK ENTITY, THE AT LEAST ONE CB RE-TRANSMITTED IN ACCORDANCE WITH THE PREFERRED CBG ALLOCATION SCHEME

FIG. 5

DYNAMIC CODE BLOCK GROUP (CBG) ALLOCATION

CROSS-REFERENCE TO RELATED APPLICATIONS

This application is a national stage application under 35 U.S.C. 371 of PCT/CN2021/098068 filed Jun. 3, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamic code block group (CBG) allocation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc., A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for wireless communications by a user equipment (UE). The method generally includes receiving, from a network entity, a first transport block (TB) comprising one or more code blocks (CBs), transmitting, to the network entity, an indication of a preferred code block group (CBG) allocation scheme selected for retransmission of at least one CB of the one or more CBs based, at least in part, on a decoding status for each of the one or more CBs, and receiving, from the network entity, the at least one CB re-transmitted in accordance with the preferred CBG allocation scheme.

One or more aspects of the subject matter described in this disclosure can be implemented in a method for wireless communications by a network entity. The method generally includes transmitting, to a UE, a first TB comprising one or more CBs, receiving, from the UE, an indication of a preferred CBG allocation scheme for re-transmission of at least one CB of the one or more CBs, the preferred CBG allocation scheme selected by the UE based, at least in part, on a decoding status for each of the one or more CBs, and re-transmitting, to the UE, the at least one CB in accordance with the preferred CBG allocation scheme.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive, from a network entity, a first TB comprising one or more CBs, transmit, to the network entity, an indication of a preferred CBG allocation scheme selected for re-transmission of at least one CB of the one or more CBs based, at least in part, on a decoding status for each of the one or more CBs, and receive, from the network entity, the at least one CB re-transmitted in accordance with the preferred CBG allocation scheme.

One or more aspects of the subject matter described in this disclosure can be implemented in an apparatus for wireless communication by a network entity. The apparatus generally includes a memory and at least one processor coupled with the memory. The at least one processor coupled with the memory is generally configured to transmit, to a UE, a first TB comprising one or more CBs, receive, from the UE, an indication of a preferred CBG allocation scheme for re-transmission of at least one CB of the one or more CBs, the preferred CBG allocation scheme selected by the UE based, at least in part, on a decoding status for each of the one or more CBs, and re-transmit, to the UE, the at least one CB in accordance with the preferred CBG allocation scheme.

One or more aspects of the subject matter described in this disclosure can be implemented in an apparatus for wireless communication. The apparatus generally includes means for receiving, from a network entity, a first TB comprising one or more CBs, means for transmitting, to the network entity, an indication of a preferred CBG allocation scheme selected for re-transmission of at least one CB of the one or more CBs based, at least in part, on a decoding status for each of the one or more CBs, and means for receiving, from the network entity, the at least one CB re-transmitted in accordance with the preferred CBG allocation scheme.

One or more aspects of the subject matter described in this disclosure can be implemented in an apparatus for wireless communication. The apparatus generally includes means for transmitting, to a UE, a first TB comprising one or more CBs, means for receiving, from the UE, an indication of a preferred CBG allocation scheme for re-transmission of at least one CB of the one or more CBs, the preferred CBG allocation scheme selected by the UE based, at least in part, on a decoding status for each of the one or more CBs, and means for re-transmitting, to the UE, the at least one CB in accordance with the preferred CBG allocation scheme.

One or more aspects of the subject matter described in this disclosure can be implemented in a computer readable medium having computer executable code stored thereon. The computer readable medium having computer executable code stored thereon generally includes code for receiving, from a network entity, a first TB comprising one or more CBs, code for transmitting, to the network entity, an indication of a preferred CBG allocation scheme selected for re-transmission of at least one CB of the one or more CBs based, at least in part, on a decoding status for each of the one or more CBs, and code for receiving, from the network entity, the at least one CB re-transmitted in accordance with the preferred CBG allocation scheme.

One or more aspects of the subject matter described in this disclosure can be implemented in a computer readable medium having computer executable code stored thereon. The computer readable medium having computer executable code stored thereon generally includes code for transmitting, to a UE, a first TB comprising one or more CBs, code for receiving, from the UE, an indication of a preferred CBG allocation scheme for re-transmission of at least one CB of the one or more CBs, the preferred CBG allocation scheme selected by the UE based, at least in part, on a decoding status for each of the one or more CBs, and code for re-transmitting, to the UE, the at least one CB in accordance with the preferred CBG allocation scheme.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

FIGS. 4A and 4B illustrate an example time domain based code block group (CBG) allocation scheme, in accordance with certain aspects of the present disclosure.

FIG. 5 is a flow diagram illustrating example operations for wireless communication by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
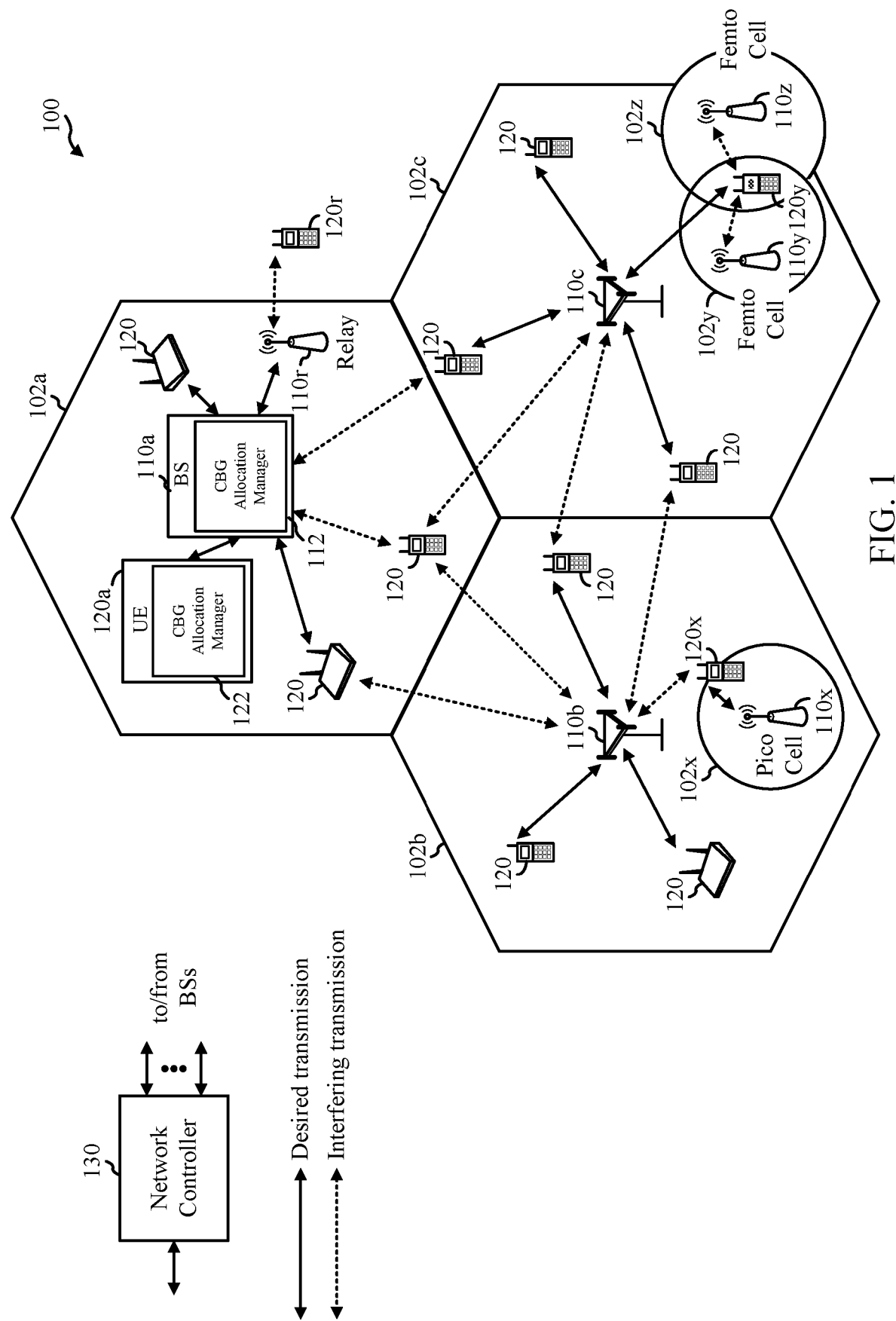
FIG. 1 is a block diagram conceptually illustrating an example telecommunications system, in accordance with certain aspects of the present disclosure.

Aspects of the present disclosure relate to wireless communications, and more particularly, to techniques for dynamic code block group (CBG) allocation between a time domain based CBG allocation scheme and a frequency domain based CBG allocation scheme. As used herein, a time domain based CBG allocation scheme maps one or more code blocks (CBs) of a transport block (TB) into one or more CBGs in a frequency-first, time-second manner while a frequency domain based CBG allocation scheme maps one or more CBs of a TB into one or more CBGs in a time-first, frequency-second manner.

According to certain aspects, a CBG allocation scheme may be selected, by a user equipment (UE), based, at least in part, on a decoding status for each CB contained within a TB. The UE may indicate the preferred CBG allocation scheme to a network entity for retransmission of one or more CBs of the TB in accordance with the preferred CBG allocations scheme. Techniques presented herein for dynamically adjusting the CBG allocation may help to improve retransmission efficiency, in particular with respect to the retransmission of CBs of a large TB, and save retransmission resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting nonbackward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

Example Wireless Communications System

FIG. 1 illustrates an example wireless communication network 100 (e.g., a New Radio (NR)/5G network), in which aspects of the present disclosure may be performed. For example, the wireless communication network 100 may include a user equipment (UE) 120 configured to perform operations 500 of FIG. 5 to transmit an indication of a preferred code block group (CBG) allocation scheme to a network entity (e.g., such as base station (BS) 110a) performing operations 600 of FIG. 6. For example, the UE 120a includes a CBG allocation manager 122 and the BS 110a includes a CBG allocation manager 112. The CBG allocation manager 122 and the CBG allocation manager 112 may be configured for dynamic CBG allocation, in accordance with aspects of the present disclosure.

As illustrated in FIG. 1, the wireless communication network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with a BS 110a and a UE 120r to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SCFDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink (DL) and/or uplink (UL). A finely dashed line with double arrows indicates interfering transmissions between a UE and a BS. Other lines show component to component (e.g., UE to UE) communication options.

Figure 2:
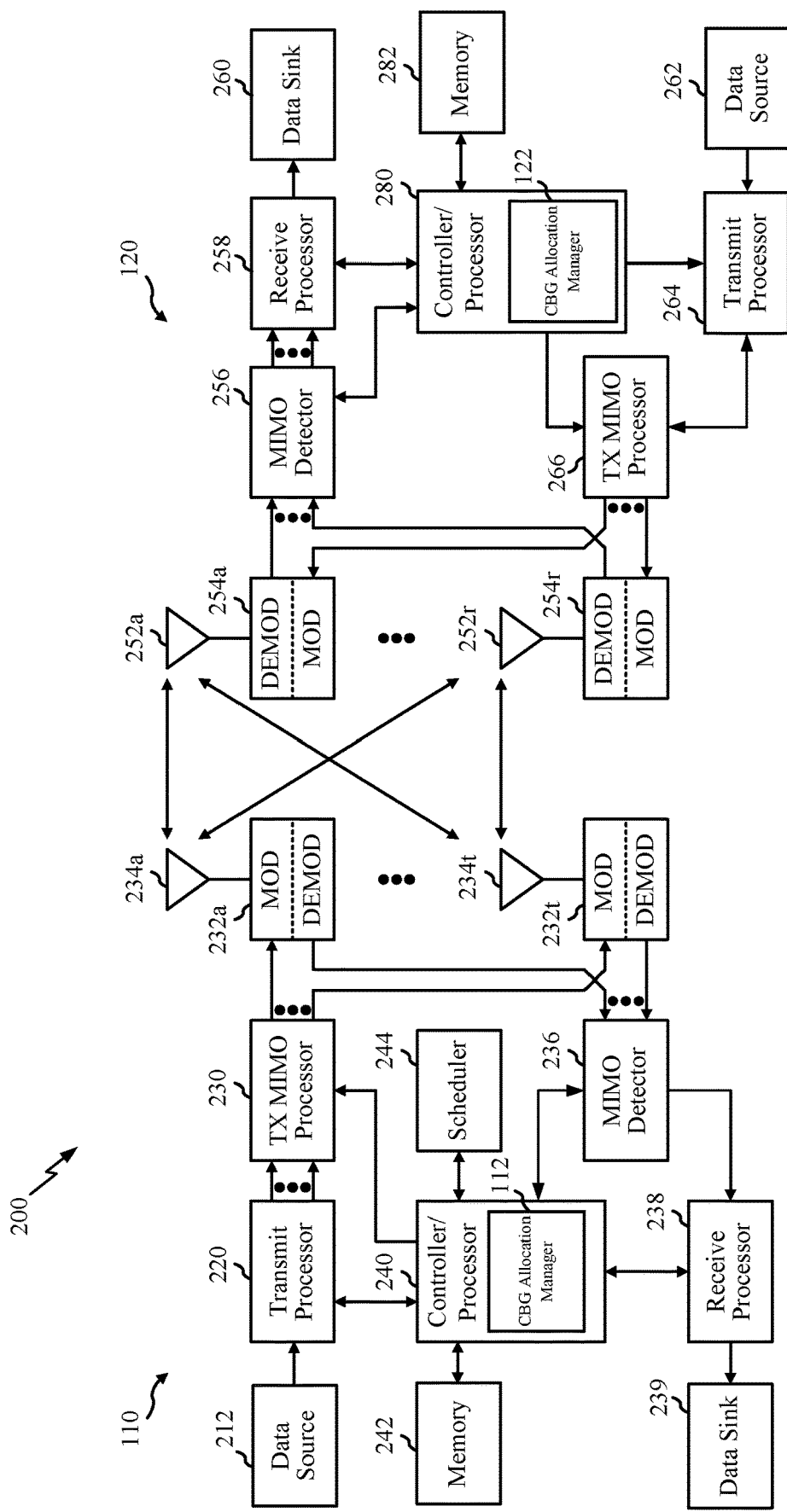
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1) which may be used to implement aspects of the present disclosure. For example, antennas 252, processors 266, 258, 264, and/or controller/processor 280, which includes CBG Allocation manager 122, of the UE 120 may be used to perform operations 500 of FIG. 5, while antennas 234, processors 220, 230, 238, and/or controller/processor 240, which includes CBG Allocation manager 112, of the BS 110 may be used to perform operations 600 of FIG. 6.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators in transceivers 232a-232t may be transmitted via the antennas 234a-234t, respectively.

At the UE 120, antennas 252a-252r may receive DL signals from the BS 110 and may provide received signals to demodulators (DEMODs) in transceivers 254a-254r, respectively. Each demodulator in transceivers 254a-254r may condition (e.g., filter, amplify, down convert, and digitize) a respective received signal to obtain input samples. Each demodulator may further process input samples (e.g., for OFDM, etc.) to obtain received symbols. A MIMO detector 256 may obtain received symbols from all demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, UL signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct operations at the BS 110 and the UE 120, respectively. The processor 240 and/or other processors and modules at the BS 110 may perform or direct execution of processes for techniques described herein. The memories 242 and 282 may store data and program codes for BS 110 and UE 120, respectively. A scheduler 244 may schedule UEs for data transmission on the DL and/or UL.

Figure 3:
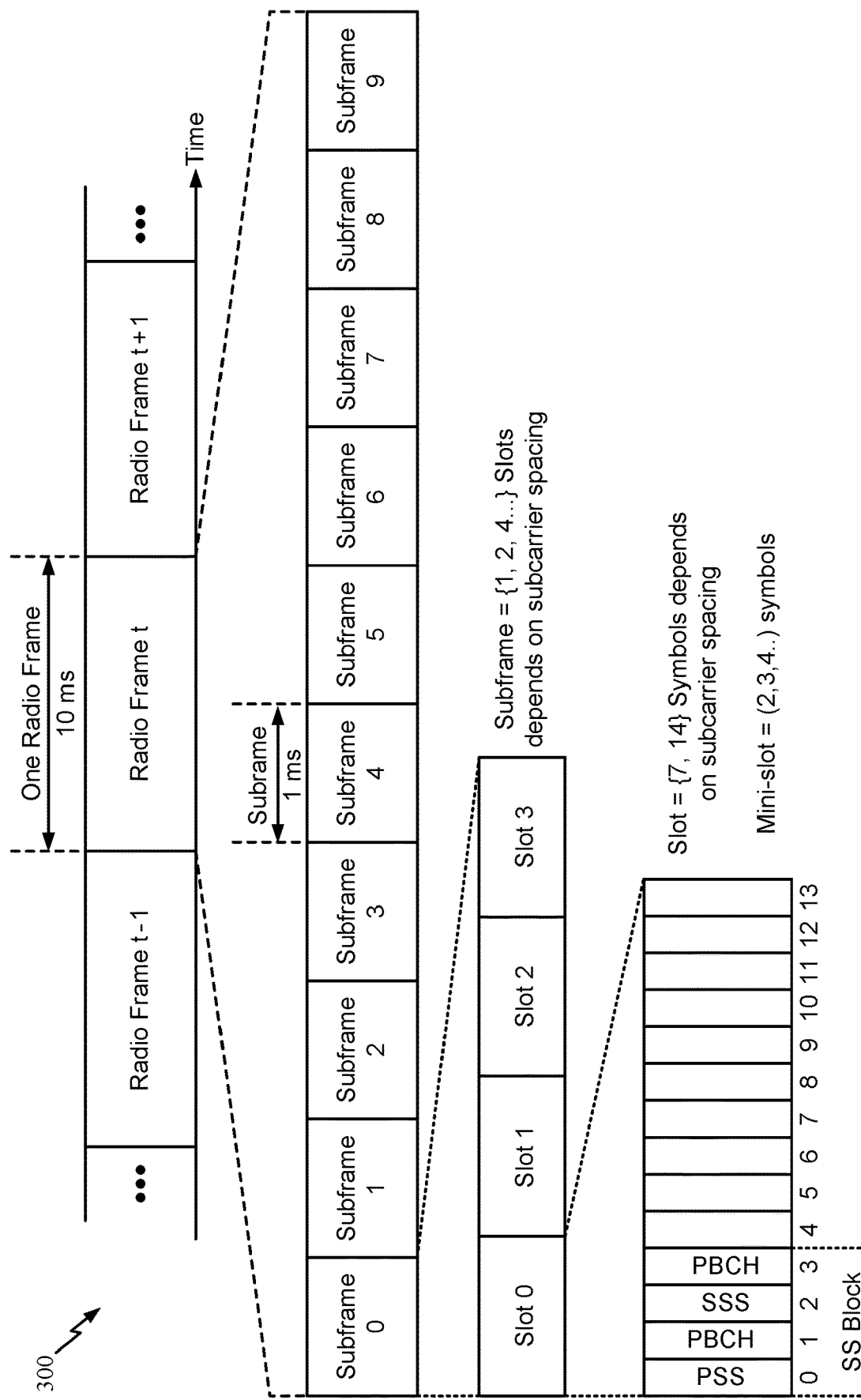
FIG. 3 illustrates an example of a frame format for a new radio (NR) system, in accordance with certain aspects of the present disclosure.

FIG. 3 illustrates an example of a frame format 300 for a new radio (NR) system, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Dynamic Code Block Group (CBG) Allocation

Wireless devices may exchange data using a transport block (TB) containing a plurality of code blocks (CBs). The receiving device attempts to decode each CB and sends acknowledgment (ACK) or negative acknowledgment (NACK) feedback for the TB to the transmitting device, based on whether each CB of the TB was successfully decoded.

In Long Term Evolution (LTE), a one-bit hybrid automatic repeat request (HARQ) ACK/NACK is used to indicate whether a single TB has been successfully decoded. Specifically, when all CBs of the TB are successfully decoded, a one-bit ACK is transmitted to indicate the TB has been successfully decoded. When at least one CB of the TB is not correctly decoded, a one-bit NACK is transmitted to indicate the TB has not been successfully decoded. In response to NACK feedback for the TB, the entire TB (e.g., all CBs of the TB) are re-transmitted.

In New Radio (NR), including enhanced mobile broadband (eMBB) scenarios, a TB may contain a large number of CBs. In some cases, only a few CBs of the TB may be unsuccessfully decoded thereby causing retransmission of the entire TB. Retransmission of the entire TB may be inefficient when, for example, a majority of the CBs of the TB are successfully decoded. In addition, NR introduces a preemption mechanism in downlink (DL) scheduling where low-latency, high-priority services preempt a scheduled service, resulting in a user equipment (UE) decoding failure. Generally, such preempted resources occupy a part of the TB, thus, retransmission of the entire TB may be needed. Retransmission of the entire TB in this case may waste a substantial amount of resources.

To increase efficiency and improve latency, in NR, a concept referred to as code block groups (CBG) based transmission is introduced. More specifically, NR groups multiples of CBs of a TB into one or more CBGs and allows for transmission of ACK/NACK feedback and CB retransmission at the CBG level. In other words, NR supports CBG level ACK/NACK feedback and retransmission with this introduced grouping of CBGs. With CBG level ACK/NACK feedback, a UE may indicate to a network entity a failure to decode one or more transmitted CBGs. This approach is more flexible than pure TB level feedback, allows more efficient use of resources, and reduces the latency associated with the transmission and processing of redundant information.

For example, a network entity (e.g., next generation NodeB (gNB)), through radio resource control (RRC), informs a UE of a maximum number of CBGs such that CBs in a TB may be collected/grouped into a single CBG of the one or more CBGs. The network entity and UE determine the number of CBs contained in each CBG according to the number of CBs in the TB. In making this determination, the network entity and UE ensure that a difference in the number of CBs contained in each CBG does not exceed one. For example, in a case where three CBGs are indicated and eight CBs make up a TB, the network entity and UE may determine the first CBG contains three CBs, the second CBG contains three CBs, and the third CBG contains two CBs.

The UE may feedback one bit for each CBG based on a decoding status of each CB in each of the CBGs. For example, when all CBs of the CBG are successfully decoded, a one-bit ACK (e.g., where the bit is set to 1) is transmitted to indicate the CBG has been successfully decoded. When at least one CB of the CBG is not correctly decoded, a one-bit NACK (e.g., where the bit is set to 0) is transmitted to indicate the CBG has not been successfully decoded. Additionally, if a UE correctly detects each of the CBGs and does not correctly detect the TB for the CBGs, the UE generates a one-bit NACK (e.g., where the bit is set to 0) for each of the CBGs. In response, the network entity will retransmit the CBG associated with the HARQ ACK/NACK bit of 0. Accordingly, CBG level ACK/NACK feedback may facilitate, by the UE, efficient recovery of CBs and/or CBGs that failed in a previous transmission.

As an illustrative example, assuming there are three CBGs, if all CBs of the first and second CBG are successfully decoded but one or more CBs in the third CBG result in a decoding failure, the UE may transmit feedback as (ACK 110), where the values of 1 indicate an ACK for the first and second CBG and the value of 0 indicates a NACK for the third CBG. In such a case, the network entity will retransmit only the third CBG to the UE.

According to existing specifications, a CBG is composed of one or more consecutive CBs. Because modulation symbols are mapped to resource elements (REs) in a frequency-first, time-second manner, several consecutive CBs may belong to the same or adjacent symbols. In other words, the allocation of CBGs is a time domain based CBG allocation scheme.

FIGS. 4A and 4B illustrate an example time domain based CBG allocation scheme 400A and 400B, respectively, in accordance with certain aspects of the present disclosure. As shown in FIGS. 4A and 4B, resource allocation may be defined in both the time domain and frequency domain. Additionally, resource blocks (RBs) may be defined for the frequency domain while symbols may be defined for the time domain. In the illustrative example, one symbol (e.g., sym #0) may be used for transmission of a physical downlink control channel (PDCCH), one symbol (e.g., sym #2) may be used for demodulation reference signal (DMRS) transmission, and twelve symbols (e.g., sym #1 and sym #3-sym #13) may be used for transmission of a physical downlink shared channel (PDSCH). Assuming the PDSCH TB is segmented into 48 CBs (e.g., CB0-CB47) and a maximum number of CBGs is four CBGs (e.g., CBG0, CBG1, CBG2, and CBG3), the CBG time domain based allocation scheme may include twelve CBs per CBG (e.g., 48 CBs/4 CBGs=12 CBs per CBG). The twelve CBGs per CBG may be spread across three symbols (e.g., 12 symbols/4 CBG=3 symbols) with four CBs per symbol (e.g., 12 CBs per CBG/3 symbols=4 CBs per symbol). More specifically CBG0 may include CB0-CB11 in sym #1, sym #3, and sym #4, CBG1 includes CB12-CB23 in sym #5, sym #6, and sym #7, CBG2 may include CB24-CB35 in sym #8, sym #9, and sym #10, and CBG3 may include CB36-CB47 in sym #11, sym #12, and sym #13.

In other words, the time domain based CBG allocation scheme maps one or more CBs of a TB into one or more CBGs in a frequency-first, time-second manner, meaning consecutive CBs span the frequency band of a first symbol before the frequency band of a second symbol is filled. As shown in FIGS. 4A and 4B, consecutive CBs, CB0-CB3, fill the frequency band of sym #1 before filling a frequency band of a second symbol (e.g., filling sym #3 with consecutive CBs, CB4-CB7).

Current time domain based CBG allocation schemes may be useful for scenarios where ultra-reliable low latency communication (URLLC) preempts eMBB resources. However, in ordinary eMBB data transmissions, most CBs at a same frequency tend to be unable to be decoded (e.g., a decoding failure for CBs at a same frequency) due to radio channel frequency selectivity. As shown in FIG. 4B, assuming there is a droop at a frequency level of the third CB in each symbol, all CBs of the TB at this frequency level, e.g., CB2, CB6, CB10, CB14, CB18, CB22, CB26, CB30, CB34, CB38, CB42, and CB46, may fail to be decoded by the UE due to radio channel frequency selectivity. In such a case, because CB2-CB46 each belong to each of the four CBGs, CBG0-CBG3, the UE may transmit one-bit NACK feedback for each of the CBGs. Feedback may be transmitted as (ACK 0000) thereby triggering retransmission of CBG0-CBG3 by the network entity. Retransmission of CBG0-CBG3 essentially requires retransmission of the entire TB, thus, in such a case, efficiency gain by use of CBG-based re-transmission over TB-based retransmission may be absent.

Aspects of the present disclosure introduce a frequency domain based CBG allocation scheme and provide techniques for dynamic CBG allocation between the time domain based CBG allocation scheme and the frequency domain based CBG allocation scheme. In particular, a CBG allocation scheme may be selected, by a UE based, at least in part, on a decoding status for each CB which makes up a transmitted TB. The UE may indicate the preferred CBG allocation scheme to a network entity for retransmission of one or more CBs in accordance with the preferred CBG allocations scheme. Techniques presented herein for dynamically adjusting the CBG allocation may help to improve retransmission efficiency, for example with respect to retransmission of CBs of a large TB, and save retransmission resources. As used herein, a time domain based CBG allocation scheme maps one or more CBs of a TB into one or more CBGs in a frequency-first, time-second manner while a frequency domain based CBG allocation scheme maps one or more CBs of a TB into one or more CBGs in a time-first, frequency-second manner.

FIG. 5 is a flow diagram illustrating example operations 500 for wireless communication by a UE, in accordance with certain aspects of the present disclosure. Operations 500 may be performed, for example, by the UE 120a in the wireless communication network 100.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 begin, at block 505, by a UE receiving, from a network entity, a first TB comprising one or more CBs.

At block 510, the UE transmits, to the network entity, an indication of a preferred CBG allocation scheme selected for re-transmission of at least one CB of the one or more CBs based, at least in part, on a decoding status for each of the one or more CBs. According to certain aspects, selecting the preferred CBG allocation scheme may include determining a time domain based CBG allocation scheme mapping the one or more CBs of the first TB into one or more first CBGs in a frequency-first, time-second manner, determining a number of first CBGs containing CBs of the first TB with the decoding status indicating a failure to decode by the UE, determining a frequency domain based CBG allocation scheme mapping the one or more CBs of the first TB into one or more second CBGs in a time-first, frequency-second manner, determining a number of second CBGs containing CBs of the first TB with the decoding status indicating a failure to decode by the UE, and determining whether the number of first CBGs is greater than the number of second CBGs, less than the number of second CBGs, or equal to the number of second CBGs. In some cases when the number of first CBGs is greater than the number of second CBGs, the preferred CBG allocation scheme selected by the UE is the frequency domain based CBG allocation scheme. In some cases when the number of first CBGs is less than the number of second CBGs, the preferred CBG allocation scheme selected by the UE is the time domain based CBG allocation scheme. In some cases when the number of first CBGs is equal to the number of second CBGs, the preferred CBG allocation scheme selected by the UE is at least one of a default CBG allocation scheme or a CBG allocation scheme used for re-transmission of CBs of a previously received TB.

At block 515, the UE receives, from the network entity, the at least one CB re-transmitted in accordance with the preferred CBG allocation scheme.

Figure 6:
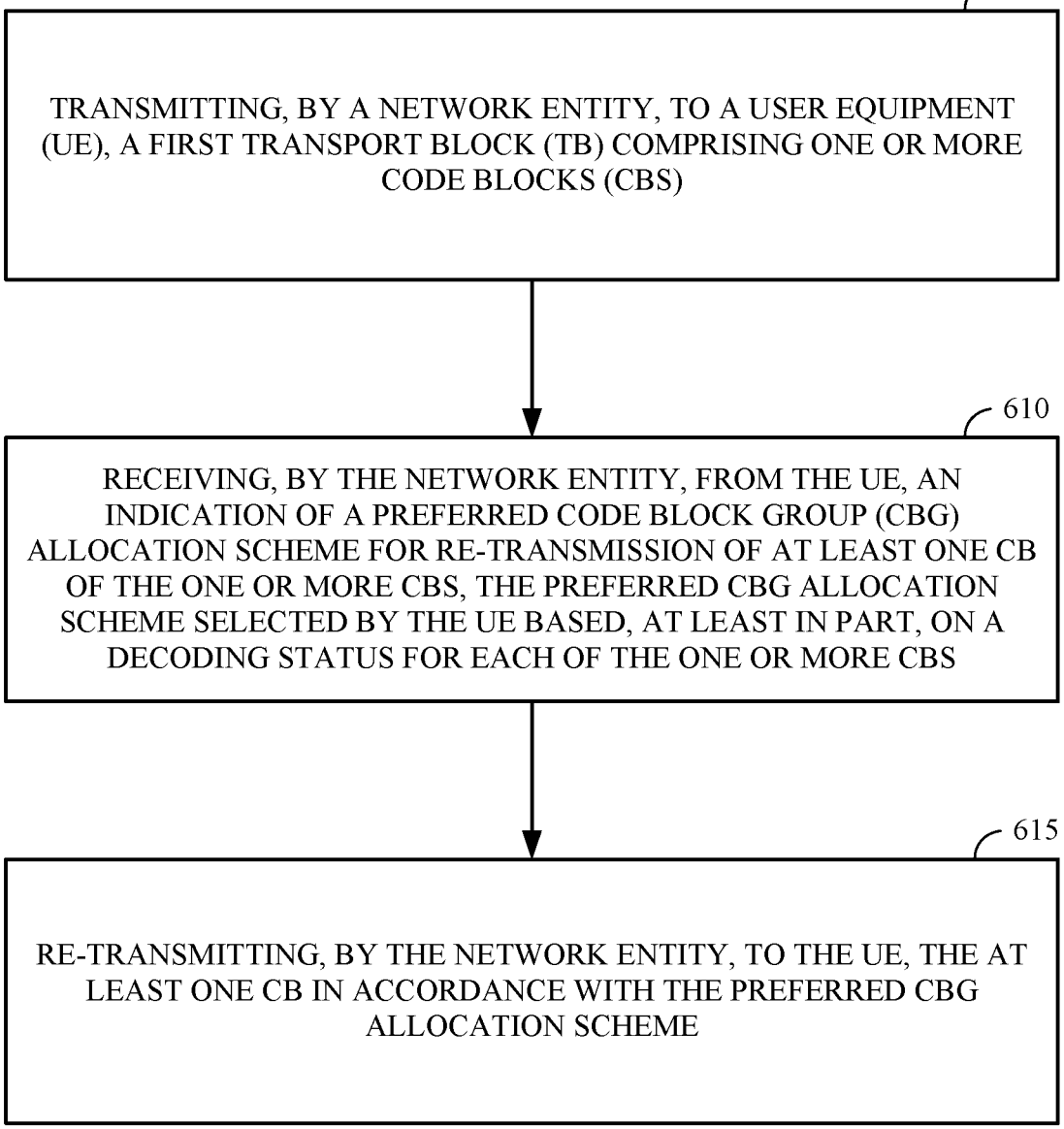
FIG. 6 is a flow diagram illustrating example operations for wireless communication by a network entity, in accordance with certain aspects of the present disclosure.

FIG. 6 is a flow diagram illustrating example operations 600 for wireless communication by a network entity, in accordance with certain aspects of the present disclosure. Operations 600 may be performed, for example, by the BS 110a in the wireless communication network 100. Operations 600 may be complementary operations by the network entity to the operations 500 performed by the UE.

Operations 600 may be implemented as software components that are executed and run on one or more processors (e.g., controller/processor 240 of FIG. 2). Further, the transmission and reception of signals by the network entity in operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 600 begin, at block 605, by the network entity transmitting, to a UE, a first TB comprising one or more CBs.

At block 610, the network entity receives, from the UE, an indication of a preferred CBG allocation scheme for re-transmission of at least one CB of the one or more CBs, the preferred CBG allocation scheme selected by the UE based, at least in part, on a decoding status for each of the one or more CBs.

At block 615, the network entity re-transmits, to the UE, the at least one CB in accordance with the preferred CBG allocation scheme.

Figure 7:
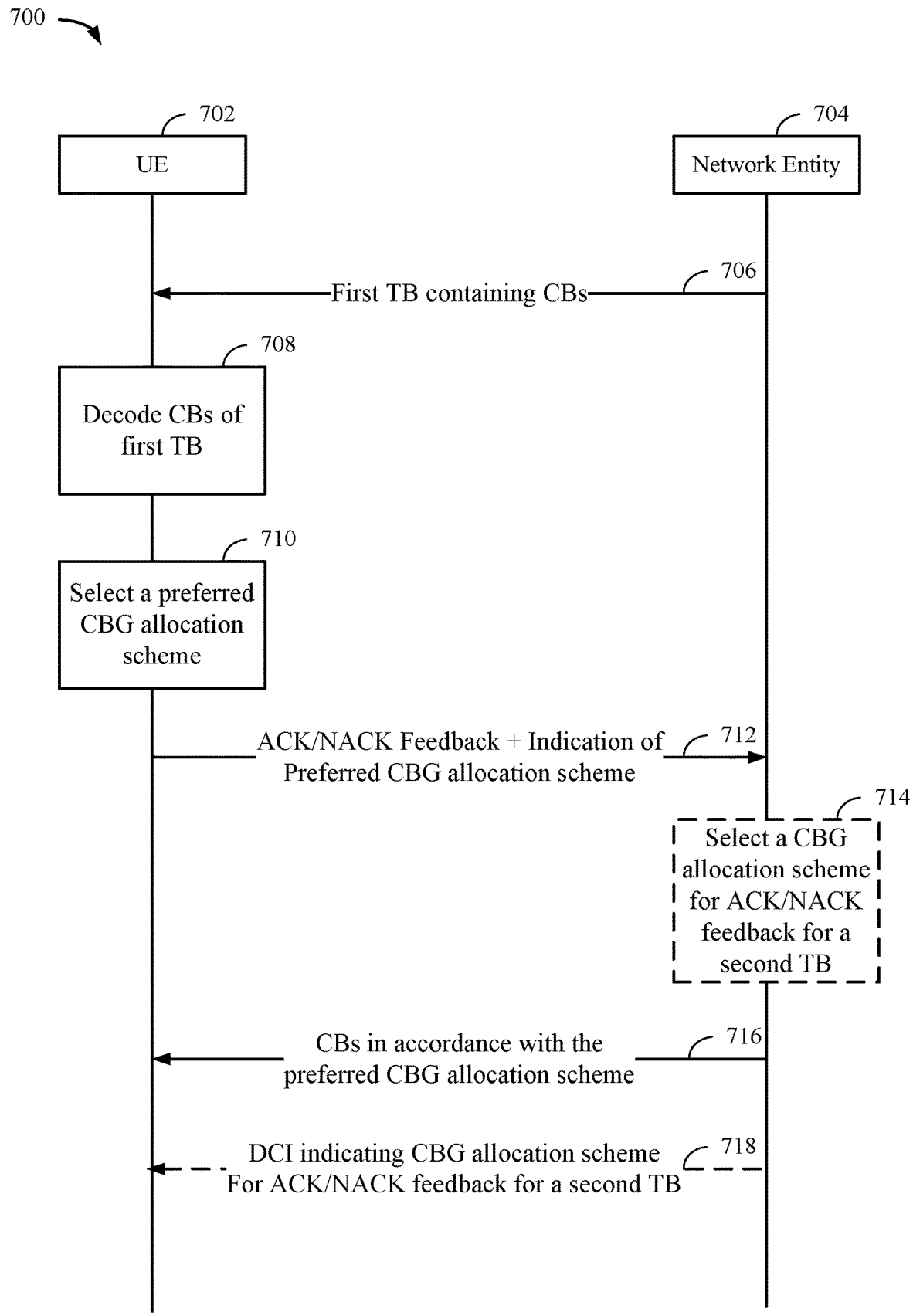
FIG. 7 is a call flow diagram illustrating example dynamic CBG allocation, in accordance with certain aspects of the present disclosure.

Operations 500 and 600 of FIGS. 5 and 6 may be understood with reference to diagram 700 of FIG. 7 which illustrates operations for the dynamic selection and indication of a CBG allocation scheme for retransmission of one or more CBGs including CBs with a decoding status indicating a failure to decode by the UE, in accordance with certain aspects of the present disclosure.

FIG. 7 is a call flow diagram illustrating example dynamic CBG allocation, in accordance with certain aspects of the present disclosure. As shown in FIG. 7, at 706, a network entity 704 (e.g., gNB) may transmit a first TB containing multiple CBs to a UE 702. At 708, UE 702 may decode CBs of the first TB. For example, where the TB contains 48 CBs, UE 702 may attempt to decode each of CB1, CB2, CB3, CB4 through CB48 and determine a decoding status for each CB. As used herein, a decoding status for each of the CBs indicates whether a UE is able to successfully decode that CB or whether the UE has failed to decode that CB.

At 710, UE 702 selects a preferred CBG allocation for re-transmission of at least one CB of the CBs which make up the first TB based, at least in part, on the decoding status associated with each of the one or more CBs. In particular, UE 702 may determine a time domain based CBG allocation scheme and further determine a number of CBGs which make up the time domain based CBG allocation scheme and contain CBs with the decoding status indicating a failure to decode. UE 702 may also determine a frequency domain based CBG allocation scheme and further determine a number of CBGs which make up the frequency domain based CBG allocation scheme and contain CBs with the decoding status indicating a failure to decode. In some cases, the UE may choose the CBG allocation scheme, e.g., time domain or frequency domain based CBG allocation scheme, based on which scheme has the least number of CBGs containing CBs with the decoding status indicating a failure to decode. Selection of the preferred CBG allocation scheme may be described in more detail with respects to FIGS. 8A and 8B.

At 712, UE 702 may transmit an indication of the preferred CBG allocation scheme to network entity 704. In addition, at 712, UE 702 may transmit uplink control information (UCI) carrying ACK feedback and/or NACK feedback for each of the CBGs of the selected allocation scheme. The ACK feedback and NACK feedback may be based on a decoding status for each of the one or more CBs of the first TB.

As an illustrative example, referring back to FIG. 4A, assuming UE 702 failed to decode CB9 and CB13, should the time domain based CBG allocation scheme shown be selected by the UE as the preferred allocation scheme, UE 702 may transmit (ACK 0011), where the two values of 0 indicate NACK feedback for CBG0 and CBG1 (because CBG0 and CBG1 include CB9 and CB13, respectively) and the two values of 1 indicate ACK feedback for CBG 2 and CBG3.

According to certain aspects, the indication of the preferred CBG allocation scheme may include a bit added to a bit structure of the UCI used to transmit ACK/NACK feedback for each of the CBGs of the selected allocation scheme. In some cases, a 1 value bit may be used to indicate the preferred allocation scheme is a frequency-domain based CBG allocation scheme and a 0 value bit may be used to indicate the preferred allocation scheme is a time-domain based CBG allocation scheme. Referring back to the example where the UE fails to decode CB9 and CB13 and the UE selects the time domain based CBG allocation scheme as the preferred CBG allocation scheme, a bit structure of the UCI would include (0, ACK 0011), wherein the first 0 value is used to indicate the preferred allocations scheme is a time domain based CBG allocation and ACK 0011 is used to indicate which CBGs need to be retransmitted to the UE.

Referring back to FIG. 7, the indication of the preferred CBG allocation scheme may inform network entity 704 to dynamically select the preferred CBG allocation scheme for retransmission of one or more CBGs. Accordingly, at 716, network entity 704 may re-transmit CBs in accordance with the preferred CBG allocation scheme. Referring back to the previous example, in this case, network entity 704 may re-transmit CBG0 and CBG1 (because CBG0 and CBG1 include CB9 and CB13, respectively) to UE 702.

In some cases, in response to receiving the indication of the preferred CBG allocation scheme at 712, network entity 704 may optionally, at 714, select a CBG allocation scheme for transmission of ACK/NACK feedback by UE 702 for a subsequently transmitted TB, (e.g., a second TB). Accordingly, at 718, network entity 704 may transmit downlink control information (DCI) indicating the selected CBG allocation scheme for transmission of ACK/NACK feedback by UE 702 for the second TB. In some cases, this indication may be indicated by adding one bit to a bit structure of the DCI. The change of CBG allocation scheme indicated in the DCI may take effect for transmission of ACK/NACK feedback for a subsequent TB (e.g., the second TB) transmitted by network entity 704.

Figure 8A:
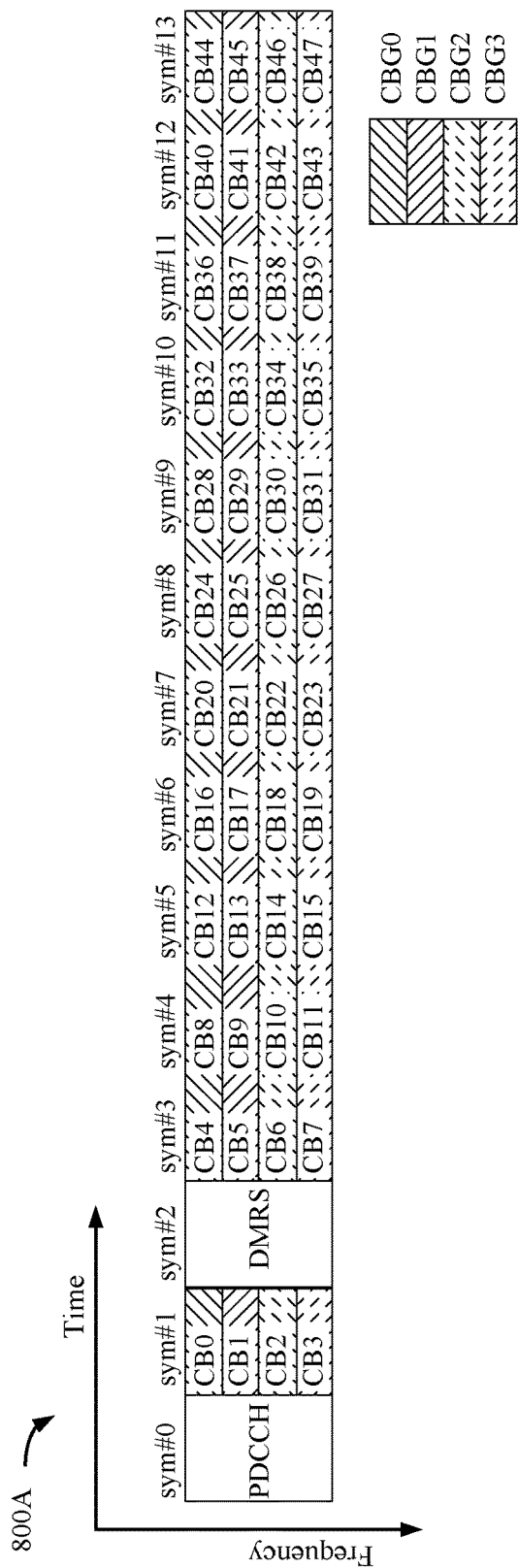
FIGS. 8A and 8B illustrate an example frequency domain based CBG allocation scheme, in accordance with certain aspects of the present disclosure.
Figure 8B:
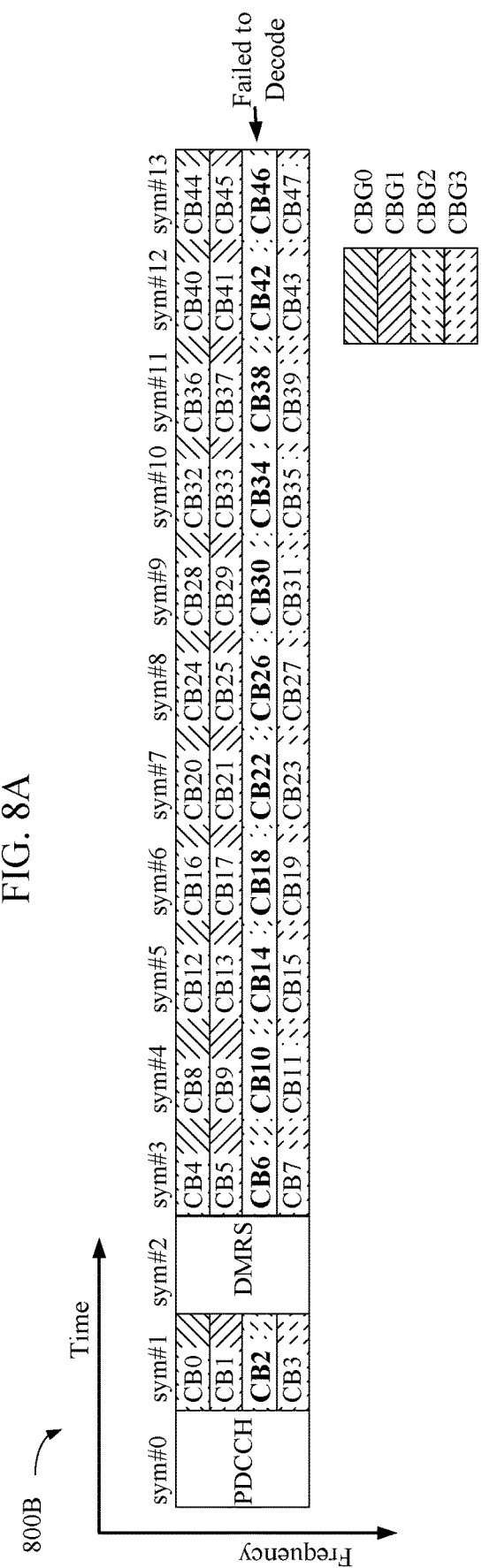

As described herein, a frequency domain based CBG allocation scheme may map one or more CBs of a TB into one or more CBGs in a time-first, frequency-second manner. According to certain aspects, the frequency domain based CBG allocation scheme may be determined by both a UE and network entity. Steps for determining the frequency domain based CBG allocation scheme may be understood with reference to diagram 800A and 800B of FIGS. 8A and 8B, respectively. FIGS. 8A and 8B illustrate an example frequency domain based CBG allocation scheme 800A and 800B, respectively, in accordance with certain aspects of the present disclosure.

As a first step in determining the frequency domain based CBG allocation scheme, a number of symbols, M, used to transmit the TB may be estimated, where M is an integer greater than or equal to one. In some cases, estimating the number of symbols used to transmit the TB includes ignoring symbols used to transmit other downlink (DL) transmissions, including at least one of, a PDCCH or a DMRS. Using the illustrative example shown in FIGS. 8A and 8B, as a first step, the UE and/or network entity may estimate the number of symbols used to transmit the TB (e.g., PDSCH) as 12 symbols (e.g., M=12) including sym #1 and sym #3-sym #13. In making this estimation, sym #0 used to transmit PDCCH and sym #2 used to transmit DMRS may be ignored.

As a second step in determining the frequency domain based CBG allocation scheme, one or more CBs of the transmitted TB may be allocated to each symbol of the estimated number of symbols to create a CB set of one or more CBs on each symbol. In some cases, allocating CBs of the TB to each symbol of the estimated number of symbols includes allocating the CBs of the TB such that a difference in the number of CBs allocated to each symbol does not exceed one. In particular, the following allocation algorithm may be used for allocating to each symbol of the estimate number of symbols to create a CB set of one or more CBs on each symbol:

$$\text{Define } M_1 = \mod(C, M), K_1 = \left\lfloor \frac{C}{M} \right\rfloor, \text{ and } K_2 = \left\lceil \frac{C}{M} \right\rceil.$$

If $M_1 > 0$, CB_array m, m=0,1, ..., $M_1$−1, consists of code blocks with indices m·$K_1$+k,k=0,1, ..., $K_1$−1. CB_ARRAY M, M=$M_1$,$M_1$+1, ..., M−1, consists of code blocks with indices $M_1$·$K_1$+(m−$M_1$)·$K_2$+k,k=0,1, ..., $K_2$−1.

where m is the CB_array (also referred to herein as CB set), C is the number of CBs in the TB, M, as mentioned herein, is the number of symbols used to transmit the TB, and K is the number of CBs to be allocated to each symbol (e.g., the number of CBs to be allocated to each CB_array). Each CB_array may correspond to one of the estimated symbols.

Referring back to FIGS. 8A and 8B, as a second step, the UE and/or network entity may allocate four CBs of the TB to each of the 12 estimated symbols. In particular, assuming the TB includes 48 CBs as shown, 4 CBs may be allocated per symbol (e.g., C/M=48 CBs/12 symbols=4 CBs per symbol). This means CB0-CB3 may be allocated to sym #1 and referred to as a first CB set, CB4-CB7 may be allocated to sym #3 and referred to as a second CB set, CB8-CB11 may be allocated to sym #4 and referred to as a third CB set, and so on. According to certain aspects, it is assumed that each CB set spans an entire frequency band when determining the frequency domain based CBG allocation scheme. Because each symbol is allocated four CBs, a difference in the number of CBs allocated to each symbol does not exceed one.

As a third step in determining the frequency domain based CBG allocation scheme, a number of CBGs may be determined. The number of CBGs may be defined as a set of values in the specification. The network entity may inform the UE of the maximum number of CBGs through RRC signaling. With reference to FIGS. 8A and 8B, as a third step, the UE and/or network entity may determine the number of CBGs is 4 including CBG0, CBG1, CBG2, and CBG3.

As a fourth step in determining the frequency domain based CBG allocation scheme, for each CB set, a number of CBs in the CB set may be determined. Referring back to FIGS. 8A and 8B, as a fourth step, the UE and/or network entity may determine the first CB set has 4 CBs (e.g., CB0-CB3), the second CB set has 4CBs (e.g., CB4-CB7), the third CB set has 4 CBs (e.g., CB8-CB11), and so on for each of the CB sets.

As a fifth step in determining the frequency domain based CBG allocation scheme, for each CB set, one or more CBs of the number of CBs in the CB set may be allocated to each CBG of the determined number of CBGs such that a difference in a number of CBs allocated to each CBG does not exceed one. In particular, the fifth step may include determining the allocation of SUB_CBG in each CB_array (e.g., CB set) while ensuring that all CBs in a given SUB_CBG occupy adjacent frequency and the difference between the number of CBs contained in different SUB_CBGs does not exceed one. The method for allocation of CBs to one or more SUB_CBGs may be determined by:

$$\text{Define } N_1 = \mod(K, N), J_1 = \left\lceil \frac{K}{N} \right\rceil, \text{ and } J_2 = \left\lfloor \frac{K}{N} \right\rfloor.$$

If $N_1 > 0$, SUB_CBG n, n=0,1, ..., $N_1$−1, consists of code blocks with indices n·$J_1$+j,j=0,1, ..., $J_1$−1. sub_cbg n, n=$N_1$,$N_1$+1, ..., N−1, consists of code blocks with indices $N_1$·$J_1$+(n−$N_1$)·$J_2$+j,j=0,1, ..., $J_2$−1.

where, as described herein, K is the number of CBs allocated to each symbol (e.g., the number of CBs allocated to each CB_array), N is the total number of CBGs, J is the number of CBs in each CB_array to be allocated to each CBG, j is the index of the CB in each CB_array, and n is the index of the SUB_CBG.

Referring back to FIGS. 8A and 8B, as a fifth step, the UE and/or network entity may determine a number of CBs in each CB set to allocate to each CBG. Taking the first CB set for example (e.g., including CB0, CB1, CB2, and CB3), the UE and/or network entity may allocate 1 CB per CBG (e.g., K/N=4 CBs in the first CB set/4 CBGs=1 CB in the first CB set per CBG). In other words, CB0 may be allocated to CBG0, CB1 may be allocated to CBG1, CB2 may be allocated to CBG2, and CB3 may be allocated to CBG3. A similar allocation may occur for each of the remaining CB sets.

As a sixth and final step in determining the frequency domain based CBG allocation scheme, CBs of the TB may be grouped into the multiple CBGs in accordance with their allocation in step five. In particular each CBG, CBG[n] may be composed of SUB_CBG[n] on all of the CB_array.

With reference to FIGS. 8A and 8B, as a sixth step, the UE and/or network entity may group CB0 in the first CB set, CB4 in the second CB set, CB8 in the third CB set, and so on through CB44 in the twelfth CB set into CBG0 because of each of these CBs were allocated to CBG0 in step five. Similar steps may be used to group CBs allocated to CBG1, CBG2, and CBG3 in step five.

Accordingly, following completion of steps one through six for determination of the frequency domain based CBG allocation scheme, the frequency domain based CBG allocation may appear similar to the scheme presented with respect to FIGS. 8A and 8B. However, the allocation scheme may depend on a number of factors including the size of the TB, a number of symbols used to transmit the TB, and a number of CBGs.

As described herein, a CBG allocation scheme may be chosen to save resources for retransmission. In some cases, a time domain based CBG allocation scheme may require retransmission of less CBGs than a frequency domain based CBG allocation scheme, and in such a case, the time domain based CBG allocation scheme may be chosen. On the other hand, in some cases, a frequency domain based CBG allocation scheme may require retransmission of less CBGs than a time domain based CBG allocation scheme, and in such a case, the frequency domain based CBG allocation scheme may chosen. Comparison of FIG. 4B and FIG. 8B may help to better understand when the frequency domain based CBG allocation scheme is chosen.

The illustrative examples presented with respect to FIG. 4B and FIG. 8B assume a maximum number of CBGs is 4 (e.g., CBG0, CBG1, CBG2, and CBG3), the number of CBs in the transmitted TB is 48, and a number of symbols used to transmit the TB is 12 (e.g., sym #1 and sym #3-sym #13). However, FIG. 4B illustrates a time domain based CBG allocation scheme while FIG. 8B illustrates a frequency domain based CBG allocation scheme.

Assuming there is a droop at a frequency level of the third CB in each symbol, all CBs of the TB at this frequency level, e.g., CB2, CB6, CB10, CB14, CB18, CB22, CB26, CB30, CB34, CB38, CB42, and CB46, may fail to be decoded by the UE due to, for example, radio channel frequency selectivity. Thus, in choosing a preferred CBG allocation scheme, the UE may consider how many CBGs would need to be transmitted to re-transmit each of the CBs at this frequency level (e.g., CBs that the UE failed to decode) in both the time domain based CBG allocation scheme and the frequency domain based CBG allocation scheme.

Specifically, with reference to the time domain based CBG allocation scheme of FIG. 4B, the UE may determine four CBGs (e.g., CBG0, CBG1, CBG2, and CBG3) need to be re-transmitted such that all CBs that were unable to be decoded by the UE are re-transmitted. On the other hand, with reference to the frequency domain based CBG allocation scheme of FIG. 8B, the UE may determine only 1 CBG (e.g., CBG2) needs to be re-transmitted such that all CBs that were unable to be decoded by the UE are re-transmitted. Accordingly, because only 1 CBG, as opposed to 4 CBGs, needs to be transmitted if a frequency domain based CBG allocation scheme is selected, the UE may select the frequency domain based CBG allocation scheme as the preferred CBG allocation scheme and indicate this preference to the network entity. By selecting the frequency domain based CBG allocation scheme, retransmission resources may be saved thereby improving resource efficiency.

In another example using the same time-domain based CBG allocation scheme of FIG. 4B, the same frequency-domain based CBG allocation scheme of FIG. 8B, and the same TB containing 48 CBs, but assuming the UE only fails to decode CB6 and CB10, in each of the time-domain based CBG allocation scheme and the frequency domain based CBG allocations scheme, the number of CBGs that would need to be transmitted to re-transmit each of the CBs that the UE failed to decode would be 1 CBG (e.g., CBG0 with respect to FIG. 4B and CBG2 with respect to FIG. 8B). In such a case where the number CBGs is equal for both the time domain and frequency domain based CBG allocation schemes, the UE may select a default CBG allocation or a CBG allocation scheme used for re-transmission of CBs of a previously received TB when selecting the preferred CBG allocation to be indicated to the network entity.

Example Wireless Communications Devices

Figure 9:
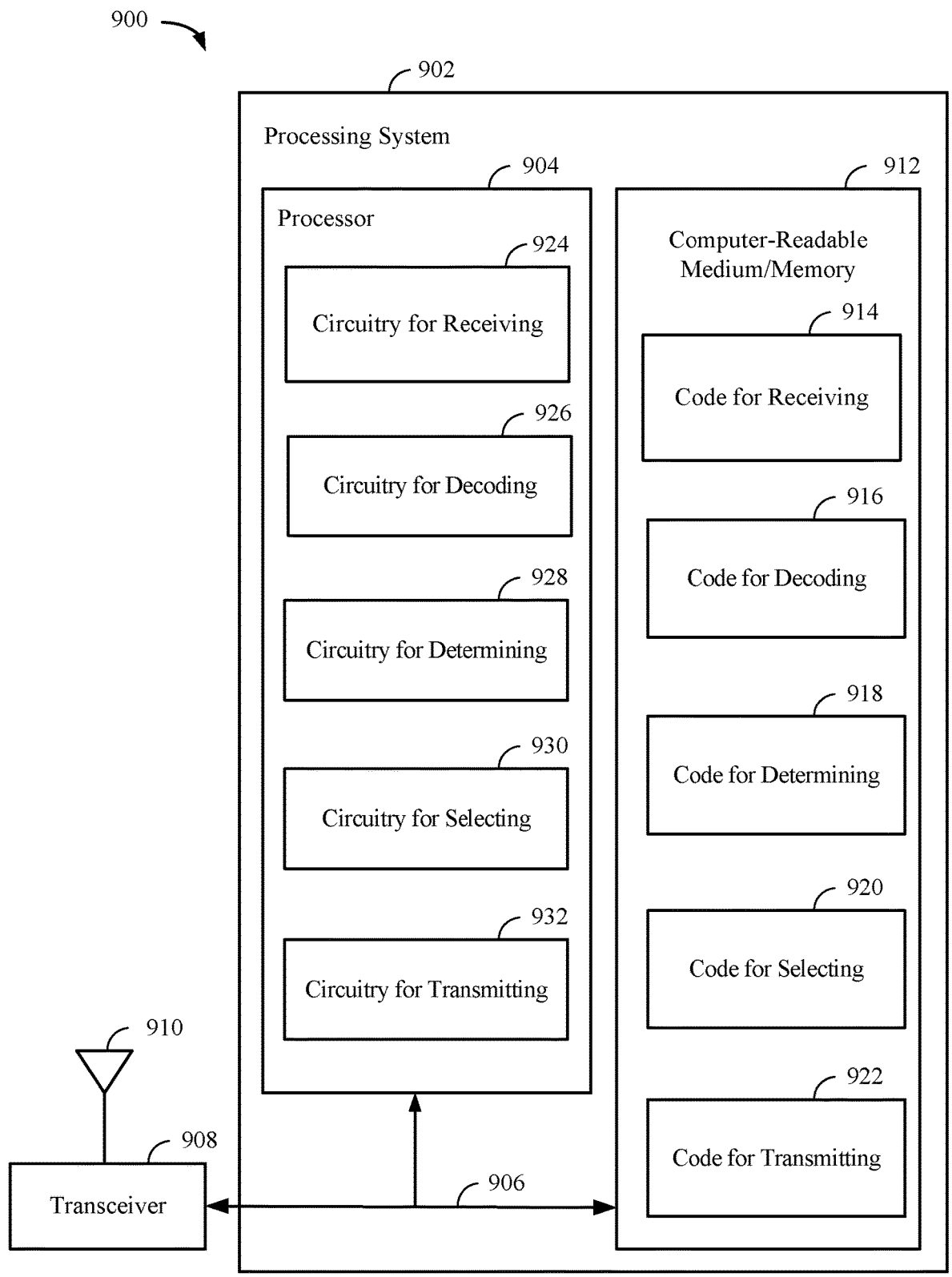
FIG. 9 illustrates a communications device that may include various components configured to perform operations for the techniques disclosed herein, in accordance with aspects of the present disclosure.

FIG. 9 illustrates a communications device 900 (e.g., a transmitter such as a UE) that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein.

In certain aspects, computer-readable medium/memory 912 stores code 914 for receiving; code 916 for decoding; code 918 for determining; code 920 for selecting; and code 922 for transmitting.

In some aspects, code 914 for receiving may include code for receiving, from a network entity, a first transport block (TB) comprising one or more code blocks (CBs). In some aspects, code 914 for receiving may include code for receiving, from the network entity, the at least one CB re-transmitted in accordance with the preferred CBG allocation scheme. In some aspects, code 916 for decoding may include code for decoding one or more CBs of the first TB. In some aspects, code 918 for determining may include code for determining a time domain based CBG allocation scheme mapping the one or more CBs of the first TB into one or more first CBGs in a frequency-first, time-second manner. In some aspects, code 918 for determining may include code for determining a frequency domain based CBG allocation scheme mapping the one or more CBs of the first TB into one or more second CBGs in a time-first, frequency-second manner. In some aspects, code 920 for selecting may include code for selecting a preferred code block group (CBG) allocation scheme for re-transmission of at least one CB of the one or more CBs based, at least in part, on a decoding status for each of the one or more CBs. In some aspects, code 922 for transmitting may include code for transmitting, to the network entity, an indication of a preferred CBG allocation scheme selected for re-transmission of at least one CB of the one or more CBs based, at least in part, on a decoding status for each of the one or more CBs.

In certain aspects, the processor 904 has circuitry configured to implement the code stored in the computer-readable medium/memory 912. The processor 904 includes circuitry 924 for receiving; circuitry 926 for decoding; circuitry 928 for determining; circuitry 930 for selecting; and circuitry 932 for transmitting.

In some aspects, circuitry 924 for receiving may include code for receiving, from a network entity, a first TB comprising one or more CBs. In some aspects, circuitry 924 for receiving may include code for receiving, from the network entity, the at least one CB re-transmitted in accordance with the preferred CBG allocation scheme. In some aspects, circuitry 926 for decoding may include code for decoding one or more CBs of the first TB. In some aspects, circuitry 928 for determining may include code for determining a time domain based CBG allocation scheme mapping the one or more CBs of the first TB into one or more first CBGs in a frequency-first, time-second manner. In some aspects, circuitry 928 for determining may include code for determining a frequency domain based CBG allocation scheme mapping the one or more CBs of the first TB into one or more second CBGs in a time-first, frequency-second manner. In some aspects, circuitry 930 for selecting may include code for selecting a preferred CBG allocation scheme for re-transmission of at least one CB of the one or more CBs based, at least in part, on a decoding status for each of the one or more CBs. In some aspects, circuitry 932 for transmitting may include code for transmitting, to the network entity, an indication of a preferred CBG allocation scheme selected for re-transmission of at least one CB of the one or more CBs based, at least in part, on a decoding status for each of the one or more CBs.

In some aspects, the operations illustrated in FIG. 5, as well as other operations described herein, may be implemented by one or more means-plus-function components.

For example, in some aspects, such operations may be implemented by means for establishing and means for transmitting.

In some aspects, means for establishing and means for transmitting, includes a processing system, which may include one or more processors, such as the receive processor 258, the transmit processor 264, the TX MIMO processor 266, and/or the controller/processor 280 of the UE 120 illustrated in FIG. 2 and/or the processing system 902 of the communication device 900 in FIG. 9.

The transceiver 908 may provide a means for receiving or transmitting information. Information may be passed on to other components of the communications device 900. The antenna 910 may correspond to a single antenna or a set of antennas. The transceiver 908 may provide means for transmitting signals generated by other components of the communications device 900.

Means for receiving or means for obtaining may include a receiver (such as the receive processor 258) or antenna(s) 252 of the UE 120 illustrated in FIG. 2. Means for transmitting or means for outputting may include a transmitter (such as the transmit processor 264) or antenna(s) 252 of the UE 120 illustrated in FIG. 2.

Notably, FIG. 9 is just use one example, and many other examples and configurations of communications device 900 are possible.

Figure 10:
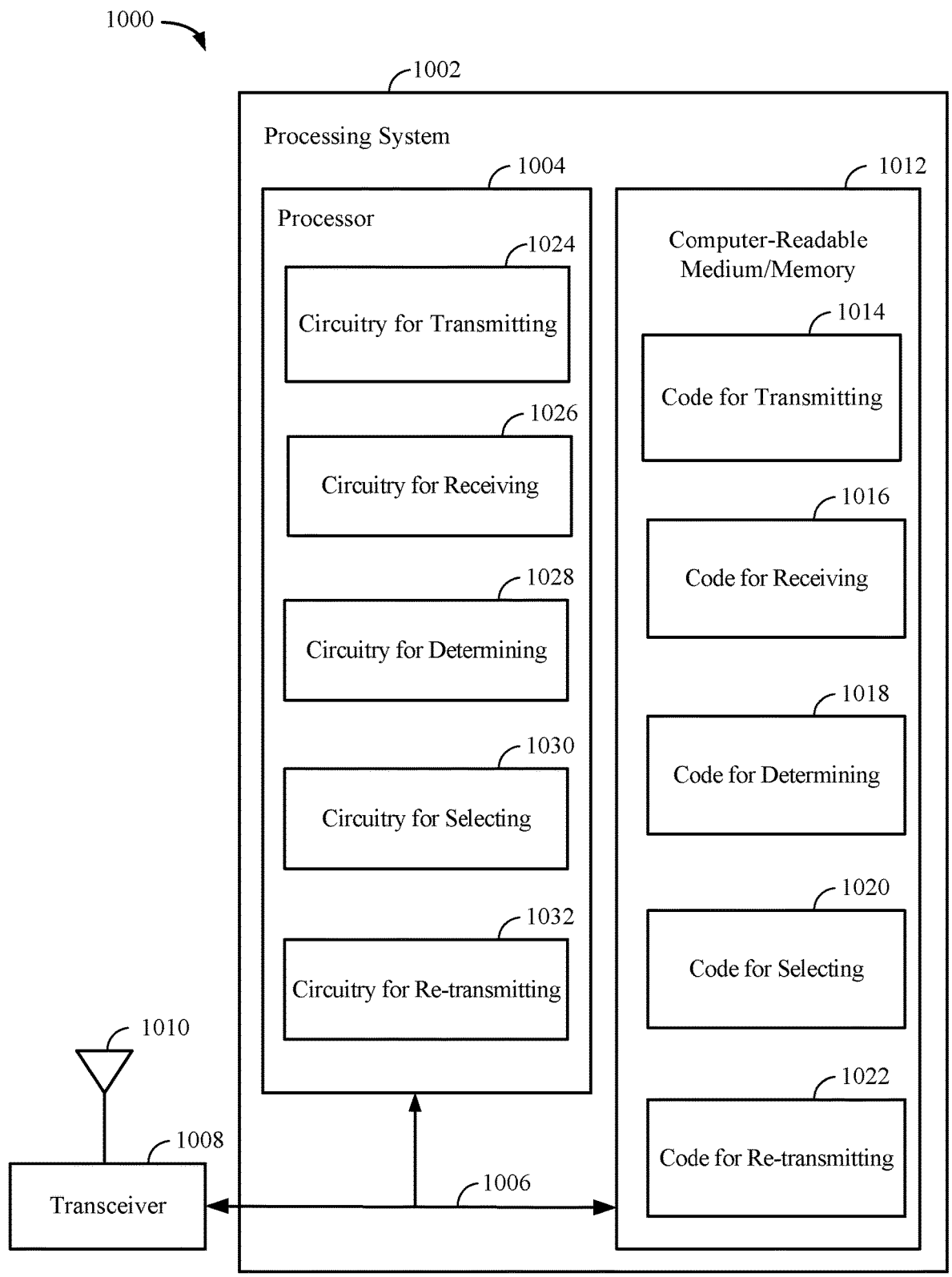
FIG. 10 illustrates a communications device that may include various components configured to perform operations for the techniques disclosed herein, in accordance with aspects of the present disclosure.

FIG. 10 illustrates a communications device 1000 (e.g., a receiver such as a gNB) that may include various components (e.g., corresponding to means-plus-function components) configured to perform operations for the techniques disclosed herein, such as the operations illustrated in FIG. 6. The communications device 1000 includes a processing system 1002 coupled to a transceiver 1008 (e.g., a transmitter and/or a receiver). The transceiver 1008 is configured to transmit and receive signals for the communications device 1300 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, or other operations for performing the various techniques discussed herein.

In certain aspects, computer-readable medium/memory 1012 stores code 1014 for transmitting; code 1016 for receiving; code 1018 for determining; code 1020 for selecting; and code 1022 for re-transmitting.

In some aspects, code 1014 for transmitting may include code for transmitting, to a UE, a first TB comprising one or more CBs. In some aspects, code 1014 for transmitting may include code for transmitting, to the UE, in response to receiving the indication of the preferred CBG allocation scheme, downlink control information (DCI) indicating a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme. In some aspects, code 1016 for receiving may include code for receiving, from the UE, an indication of a preferred CBG allocation scheme for re-transmission of at least one CB of the one or more CBs, the preferred CBG allocation scheme selected by the UE based, at least in part, on a decoding status for each of the one or more CBs. In some aspects, code 1016 for receiving may include code for receiving, from the UE, uplink control information (UCI) carrying at least one of ACK feedback or NACK feedback for each of one or more CBGs containing the one or more CBs of the first TB, wherein the ACK feedback and the NACK feedback is based on a decoding status for each of the one or more CBs of the first TB. In some aspects, code 1018 for determining may include code for determining the frequency domain based CBG allocation scheme by estimating the number of first CBGs containing CBs of the first TB and a number of CBs in each of the first CBGs. In some aspects, code 1020 for selecting may include circuitry for selecting a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme. In some aspects, code 1022 for re-transmitting may include code for re-transmitting, to the UE, the at least one CB in accordance with the preferred CBG allocation scheme.

In certain aspects, the processor 1004 has circuitry configured to implement the code stored in the computer-readable medium/memory 1012. The processor 1004 includes circuitry 1024 for transmitting; circuitry 1026 for receiving; circuitry 1028 for determining; circuitry 1030 for selecting; and circuitry 1032 for re-transmitting.

In some aspects, circuitry 1024 for transmitting may include circuitry for transmitting, to a UE, a first TB comprising one or more CBs. In some aspects, circuitry 1024 for transmitting may include code for transmitting, to the UE, in response to receiving the indication of the preferred CBG allocation scheme, DCI indicating a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme. In some aspects, circuitry 1026 for receiving may include circuitry for receiving, from the UE, an indication of a preferred CBG allocation scheme for re-transmission of at least one CB of the one or more CBs, the preferred CBG allocation scheme selected by the UE based, at least in part, on a decoding status for each of the one or more CBs. In some aspects, circuitry 1026 for receiving may include code for receiving, from the UE, UCI carrying at least one of ACK feedback or NACK feedback for each of one or more CBGs containing the one or more CBs of the first TB, wherein the ACK feedback and the NACK feedback is based on a decoding status for each of the one or more CBs of the first TB. In some aspects, circuitry 1028 for determining may include circuitry for determining the frequency domain based CBG allocation scheme by estimating the number of first CBGs containing CBs of the first TB and a number of CBs in each of the first CBGs. In some aspects, circuitry 1030 for selecting may include circuitry for selecting a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme. In some aspects, circuitry 1032 for re-transmitting may include circuitry for re-transmitting, to the UE, the at least one CB in accordance with the preferred CBG allocation scheme.

In some aspects, the operations illustrated in FIG. 10, as well as other operations described herein, may be implemented by one or more means-plus-function components. For example, in some aspects, such operations may be implemented by means for establishing, means for receiving, means for transferring, and means for reestablishing.

In some aspects, means for establishing, means for transferring, means for reestablishing, includes a processing system, which may include one or more processors, such as the receive processor 238, the transmit processor 220, the TX MIMO processor 230, and/or the controller/processor 240 of the BS 110 illustrated in FIG. 2 and/or the processing system 1002 of the communication device 1000 in FIG. 10.

The transceiver 1008 may provide a means for receiving or transmitting information. Information may be passed on to other components of the communications device 1000. The antenna 1010 may correspond to a single antenna or a set of antennas. The transceiver 1008 may provide means for transmitting signals generated by other components of the communications device 1000.

Means for receiving or means for obtaining may include a receiver (such as the receive processor 238) or antenna(s) 234 of the BS 110 illustrated in FIG. 2. Means for transmitting or means for outputting (or means for transferring) may include a transmitter (such as the transmit processor 220) or antenna(s) 234 of the BS 110 illustrated in FIG. 2.

Notably, FIG. 10 is just use one example, and many other examples and configurations of communications device 1000 are possible.

EXAMPLE CLAUSES

Implementation examples are described in the following numbered clauses:

Clause 1: A method for wireless communication by a user equipment (UE), comprising: receiving, from a network entity, a first transport block (TB) comprising one or more code blocks (CBs); transmitting, to the network entity, an indication of a preferred code block group (CBG) allocation scheme selected for re-transmission of at least one CB of the one or more CBs based, at least in part, on a decoding status for each of the one or more CBs; and receiving, from the network entity, the at least one CB re-transmitted in accordance with the preferred CBG allocation scheme.

Clause 2: The method of Clause 1, further comprising: transmitting, to the network entity, uplink control information (UCI) carrying at least one of acknowledgement (ACK) feedback or negative ACK (NACK) feedback for each of one or more CBGs containing the one or more CBs of the first TB, wherein the ACK feedback and the NACK feedback is based on a decoding status for each of the one or more CBs of the first TB.

Clause 3: The method of Clause 2, wherein the CBGs containing the one or more CBs of the first TB is based, at least in part, on the preferred CBG allocation scheme.

Clause 4: The method of Clause 2 or 3, wherein the indication of the preferred CBG allocation scheme comprises a bit added to a bit structure of the UCI.

Clause 5: The method of any of Clauses 1-4, further comprising: receiving, from the network entity, in response to transmitting the indication of the preferred CBG allocation scheme, downlink control information (DCI) indicating a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme.

Clause 6: The method of Clause 5, wherein the indication of the CBG allocation scheme to be used for transmission of the at least one of ACK feedback or NACK feedback for the one or more CBs of the second TB comprises a bit added to a bit structure of the DCI.

Clause 7: The method of any of Clauses 1-5, wherein selecting the preferred CBG allocation scheme comprises: determining a time domain based CBG allocation scheme mapping the one or more CBs of the first TB into one or more first CBGs in a frequency-first, time-second manner; determining a number of first CBGs containing CBs of the first TB with the decoding status indicating a failure to decode by the UE; determining a frequency domain based CBG allocation scheme mapping the one or more CBs of the first TB into one or more second CBGs in a time-first, frequency-second manner; determining a number of second CBGs containing CBs of the first TB with the decoding status indicating a failure to decode by the UE; and determining whether the number of first CBGs is greater than the number of second CBGs, less than the number of second CBGs, or equal to the number of second CBGs.

Clause 8: The method of Clause 7, wherein: when the number of first CBGs is greater than the number of second CBGs, the preferred CBG allocation scheme comprises the frequency domain based CBG allocation scheme; when the number of first CBGs is less than the number of second CBGs, the preferred CBG allocation scheme comprises the time domain based CBG allocation scheme; and when the number of first CBGs is equal to the number of second CBGs, the preferred CBG allocation scheme comprises at least one of a default CBG allocation scheme or a CBG allocation scheme used for re-transmission of CBs of a previously received TB.

Clause 9: The method of Clause 7 or 8, wherein determining the frequency domain based CBG allocation scheme comprises estimating the number of first CBGs containing CBs of the first TB and a number of CBs in each of the first CBGs.

Clause 10: The method of Clause 9, wherein estimating the number of first CBGs containing CBs of the first TB and a number of CBs of the first TB in each of the first CBGs comprises: estimating a number of symbols used to transmit the first TB; allocating the one or more CBs of the first TB to each symbol of the estimated number of symbols to create a CB set of one or more CBs on each symbol; determining a number of CBGs; for each CB set: determining a number of CBs in the CB set; and allocating one or more CBs of the number of CBs in the CB set to each CBG of the determined number of CBGs such that a difference in a number of CBs allocated to each CBG does not exceed one; and grouping the one or more CBs into multiple first CBGs in accordance with their allocation.

Clause 11: The method of Clause 10, wherein estimating the number of symbols used to transmit the first TB comprises ignoring symbols used to transmit other downlink transmissions, including at least one of, a physical downlink control channel (PDCCH) or a demodulation reference signal (DMRS).

Clause 12: The method of Clause 10 or 11, wherein allocating the one or more CBs of the first TB to each symbol of the estimated number of symbols comprises allocating the one or more CBs of the first TB such that a difference in the number of CBs allocated to each symbol does not exceed one.

Clause 13: The method of any of Clauses 10-12, wherein when determining the frequency domain based CBG allocation scheme it is assumed that each CB set spans an entire frequency band.

Clause 14: A method for wireless communication by a network entity, comprising: transmitting, to a user equipment (UE), a first transport block (TB) comprising one or more code blocks (CBs); receiving, from the UE, an indication of a preferred code block group (CBG) allocation scheme for re-transmission of at least one CB of the one or more CBs, the preferred CBG allocation scheme selected by the UE based, at least in part, on a decoding status for each of the one or more CBs; and re-transmitting, to the UE, the at least one CB in accordance with the preferred CBG allocation scheme.

Clause 15: The method of Clause 14, further comprising: receiving, from the UE, uplink control information (UCI) carrying at least one of acknowledgement (ACK) feedback or negative ACK (NACK) feedback for each of one or more CBGs containing the one or more CBs of the first TB, wherein the ACK feedback and the NACK feedback is based on a decoding status for each of the one or more CBs of the first TB.

Clause 16: The method of Clause 15, wherein the CBGs containing the one or more CBs of the first TB is based, at least in part, on the preferred CBG allocation scheme.

Clause 17: The method of clause 15 or 16, wherein the indication of the preferred CBG allocation scheme comprises a bit added to a bit structure of the UCI.

Clause 18: The method of any of Clauses 14-17, further comprising: transmitting, to the UE, in response to receiving the indication of the preferred CBG allocation scheme, downlink control information (DCI) indicating a CBG allocation scheme to be used for transmission of at least one of ACK feedback or NACK feedback for one or more CBs of a second TB, wherein the CBG allocation scheme is selected by the network entity based, at least in part, on the preferred CBG allocation scheme.

Clause 19: The method of Clause 18, wherein the indication of the CBG allocation scheme to be used for transmission of the at least one of ACK feedback or NACK feedback for the one or more CBs of the second TB comprises a bit added to a bit structure of the DCI.

Clause 20: The method of any of Clauses 14-19, wherein the preferred CBG allocation scheme comprises at least one of: a time domain based CBG allocation scheme mapping the one or more CBs of the first TB into one or more first CBGs in a frequency-first, time-second manner; or a frequency domain based CBG allocation scheme mapping the one or more CBs of the first TB into one or more second CBGs in a time-first, frequency-second manner.

Clause 21: The method of Clause 20, wherein when the preferred CBG allocation scheme comprises a frequency domain based CBG allocation scheme, the method further comprises determining the frequency domain based CBG allocation scheme by estimating a number of first CBGs containing CBs of the first TB and a number of CBs in each of the first CBGs.

Clause 22: The method of Clause 21, wherein estimating the number of first CBGs containing CBs of the first TB and a number of CBs of the first TB in each of the first CBGs comprises: estimating a number of symbols used to transmit the first TB; allocating the one or more CBs of the first TB to each symbol of the estimated number of symbols to create a CB set of one or more CBs on each symbol; determining a number of CBGs; for each CB set: determining a number of CBs in the CB set; and allocating one or more CBs of the number of CBs in the CB set to each CBG of the determined number of CBGs such that a difference in a number of CBs allocated to each CBG does not exceed one; and grouping the one or more CBs into multiple first CBGs in accordance with their allocation.

Clause 23: The method of Clause 22, wherein estimating the number of symbols used to transmit the first TB comprises ignoring symbols used to transmit other downlink transmissions, including at least one of, a physical downlink control channel (PDCCH) or a demodulation reference signal (DMRS).

Clause 24: The method of Clause 22 or 23, wherein allocating the one or more CBs of the first TB to each symbol of the estimated number of symbols comprises allocating the one or more CBs of the first TB such that a difference in the number of CBs allocated to each symbol does not exceed one.

Clause 25: The method of any of Clauses 22-24, wherein when determining the frequency domain based CBG allocation scheme it is assumed that each CB set spans an entire frequency band.

Clause 26: An apparatus, comprising: at least one processor; and a memory coupled to the at least one processor, the memory including instructions executable by the at least one processor to cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising
    executable instructions that, when executed by one or more processors of an apparatus, cause the apparatus to perform a method in accordance with any one of Clauses 1-25.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
   receiving, from a network entity, a first transport block (TB) comprising one or more code blocks (CBs);
   transmitting, to the network entity, an indication of a time domain-based code block group (CBG) allocation scheme or a frequency domain-based CBG allocation scheme selected based, at least in part, on a decoding status for the one or more CBs; and
   receiving, from the network entity, one or more subsequent transmissions in accordance with the selected time domain-based CBG allocation scheme or frequency domain-based CBG allocation scheme.

2. The method of claim 1, further comprising transmitting, to the network entity, uplink control information (UCI) carrying at least one of acknowledgement (ACK) feedback or negative ACK (NACK) feedback for each of one or more CBGs containing the one or more CBs of the first TB, wherein the ACK feedback and the NACK feedback is based on the decoding status for each of the one or more CBs of the first TB.

3. The method of claim 2, wherein the indication of the selected time domain-based CBG allocation scheme or frequency domain-based CBG allocation scheme comprises a bit added to a bit structure of the UCI.

4. The method of claim 1, further comprising receiving, from the network entity, in response to transmitting the indication of the selected time domain-based CBG allocation scheme or frequency domain-based CBG allocation scheme, downlink control information (DCI) indicating the time domain-based CBG allocation scheme or the frequency domain-based CBG allocation scheme.

5. The method of claim 4, wherein the indication of the time domain-based CBG allocation scheme or the frequency domain-based CBG allocation scheme comprises a bit added to a bit structure of the DCI.

6. The method of claim 1, wherein:
   the time domain-based CBG allocation scheme maps CBs into CBGs in a frequency-first, time-second manner;
   determining, based on the time domain-based CBG allocation scheme, a first number of first CBGs containing CBs of the first TB with the decoding status indicating a failure to decode by the UE;
   the frequency domain-based CBG allocation scheme maps CBs into CBGs in a time-first, frequency-second manner; and
   determining, based on the frequency domain-based CBG allocation, a second number of CBGs containing the CBs of the first TB with the decoding status indicating a failure to decode by the UE.

7. The method of claim 6, wherein:
   when the first number of CBGs is greater than the second number of CBGs, selecting to indicate the frequency domain-based CBG allocation scheme;
   when the first number of CBGs is less than the second number of second CBGs, selecting to indicate the time domain-based CBG allocation scheme; and
   when the first number of CBGs is equal to the second number of CBGs, selecting to indicate a default one of the time domain-based CBG allocation scheme and the frequency domain-based CBG allocation scheme or selecting a time domain-based CBG allocation scheme or a frequency domain-based CBG allocation scheme used for re-transmission of CBs of a previously received TB.

8. The method of claim 1, further comprising determining the frequency domain-based CBG allocation scheme, wherein determining the frequency domain-based CBG allocation scheme comprises:
   estimating a number of CBGs containing one or more CBs of a TB comprising a total number of CBs; and
   estimating a number of the one or more CBs contained in each of the number of the CBGs.

9. The method of claim 8, further comprising:
   estimating a number of symbols used to transmit the TB;
   dividing the total number of CBs of the TB among the estimated number of symbols, wherein a number of the CBs, of the total number of CBs, allocated to each symbol of the number of symbols is equal or differs by one;
   determining a number of CBGs; and
   dividing the the number of CBs allocated to each respective symbol, of the number of symbols, among the determined number of CBGs, wherein a number of CBs, of the total number of CBs, allocated to each CBG of the number of CBGs is equal or differs by one.

10. The method of claim 9, wherein the estimating the number of the symbols used to transmit the TB comprises ignoring symbols used to transmit other downlink transmissions, the other downlink transmissions including at least one of; a physical downlink control channel (PDCCH) or a demodulation reference signal (DMRS).

11. The method of claim 9, wherein the dividing the total number of CBs among the estimated number of symbols comprising dividing the total number of CBs among the estimated number of symbols in frequency resources spanning an entire frequency band.

12. A method for wireless communication by a network entity, the method comprising:
transmitting, to a user equipment (UE), a first transport block (TB) comprising one or more code blocks (CBs);
receiving, from the UE, an indication of a selected time domain-based code block group (CBG) allocation scheme or a frequency domain-based CBG allocation scheme; and
transmitting, to the UE, a subsequent transmission in accordance with the selected time domain-based CBG allocation scheme or frequency domain-based CBG allocation scheme.

13. The method of claim 12, further comprising receiving, from the UE, uplink control information (UCI) carrying at least one of acknowledgement (ACK) feedback or negative ACK (NACK) feedback for each of one or more CBGs containing the one or more CBs of the first TB.

14. The method of claim 13, wherein the indication of the selected time domain-based CBG allocation scheme or frequency domain-based CBG allocation scheme comprises a bit added to a bit structure of the UCI.

15. The method of claim 12, further comprising transmitting, to the UE, in response to receiving the indication of the selected time domain-based CBG allocation scheme or frequency domain-based CBG allocation scheme, downlink control information (DCI) indicating the time domain-based CBG allocation scheme or the frequency domain-based CBG allocation scheme, wherein the CBG allocation scheme is selected by the network entity based, at least in part, on the indication of the selected time domain-based CBG allocation scheme or frequency domain-based CBG allocation scheme.

16. The method of claim 15, wherein the indication of the time domain-based CBG allocation scheme or the frequency domain-based CBG allocation scheme comprises a bit added to a bit structure of the DCII.

17. The method of claim 12, wherein:
the time domain-based CBG allocation scheme maps CBs into CBGs in a frequency-first, time-second manner; or
the frequency domain-based CBG allocation scheme maps CBs into CBGs in a time-first, frequency-second manner.

18. The method of claim 17, further comprising determining the frequency domain-based CBG allocation scheme, wherein determining the frequency domain-based CBG allocation scheme comprises:
estimating a number of CBGs containing CBs of a TB comprising a total number of CBs; and
estimating a number of CBs, of the total number of CBs, contained in each of the estimated number of CBGs.

19. The method of claim 18, further comprising:
estimating a number of symbols used to transmit the TB;
dividing the total number of CBs of the TB among the estimated number of symbols, wherein a number of the CBs, of the total number of CBs, allocated to each symbol of the number of symbols is equal or differs by one;
determining a number of CBGs; and
dividing the number of CBs allocated to each respective symbol, of the number of symbols, among the determined number of CBGs, wherein a number of CBs, of the total number of CBs, allocated to each CBG of the number of CBGs is equal or differs by one.

20. The method of claim 19, wherein the estimating the number of the symbols used to transmit the TB comprises ignoring symbols used to transmit other downlink transmissions, the other downlink transmissions including at least one of: a physical downlink control channel (PDCCH) or a demodulation reference signal (DMRS).

21. The method of claim 19, wherein the dividing the total number of CBs among the estimated number of symbols comprising dividing the total number of CBs among the estimated number of symbols in frequency resources spanning an entire frequency band.

22. An apparatus for wireless communication by a user equipment (UE), the apparatus comprising:
at least one processor; and
a memory coupled to the at least one processor, the memory including instructions executable by the at least one processor to cause the apparatus to:
receive, from a network entity, a first transport block (TB) comprising one or more code blocks (CBs);
transmit, to the network entity, an indication of a time domain-based code block group (CBG) allocation scheme or a frequency domain-based CBG allocation scheme selected for re-transmission of at least one CB of the one or more CBs based, at least in part, on a decoding status for the one or more CBs; and
receive, from the network entity, one or more subsequent transmissions in accordance with the selected time domain-based CBG allocation scheme or frequency domain-based CBG allocation scheme.

23. The apparatus of claim 22, wherein the memory further includes instructions executable by the at least one processor to cause the apparatus to transmit, to the network entity, uplink control information (UCI) carrying at least one of acknowledgement (ACK) feedback or negative ACK (NACK) feedback for each of one or more CBGs containing the one or more CBs of the first TB, and wherein the ACK feedback and the NACK feedback is based on the decoding status for each of the one or more CBs of the first TB.

24. The apparatus of claim 22, wherein the memory further includes instructions executable by the at least one processor to cause the apparatus to:
the time domain-based CBG allocation scheme maps CBs into CBGs in a frequency-first, time-second manner;
determine, based on the time domain-based CBG allocation scheme, a first number of first CBGs containing CBs of the first TB with the decoding status indicating a failure to decode by the UE;
the frequency domain-based CBG allocation scheme maps CBs into CBGs in a time-first, frequency-second manner; and
determine, based on the frequency domain-based CBG allocation, a second number of second CBGs containing the CBs of the first TB with the decoding status indicating a failure to decode by the UE; and
determine whether the number of first CBGs is greater than the number of second CBGs, less than the number of second CBGs, or equal to the number of second CBGs.

25. The apparatus of claim 24, wherein the memory further includes instructions executable by the at least one processor to cause the apparatus to:
when the first number of first CBGs is greater than the second number of second CBGs, select to indicate the preferred CBG allocation scheme comprises the frequency domain-based CBG allocation scheme;
when the first number of first CBGs is less than the second number of second CBGs, select to indicate the preferred CBG allocation scheme comprises the time domain-based CBG allocation scheme; and
when the first number of first CBGs is equal to the second number of second CBGs, select to indicate the preferred CBG allocation scheme comprises at least one of a default one of the time domain-based CBG allocation scheme and the frequency domain-based CBG allocation scheme or selecting a time domain-based CBG allocation scheme or a frequency domain-based CBG allocation scheme used for re-transmission of CBs of a previously received TB.

26. An apparatus for wireless communication by a network entity, comprising:
at least one processor; and
a memory coupled to the at least one processor, the memory including instructions executable by the at least one processor to cause the apparatus to:
   transmit, to a user equipment (UE), a first transport block (TB) comprising one or more code blocks (CBs);
   receive, from the UE, an indication of a selected time domain-based code block group (CBG) allocation scheme or a frequency domain-based CBG allocation scheme; and
   transmit, to the UE, a subsequent transmission in accordance with the selected time domain-based CBG allocation scheme or frequency domain-based CBG allocation scheme.

* * * * *